United States Patent [19]

Walston, Jr.

[11] Patent Number: 4,694,582
[45] Date of Patent: Sep. 22, 1987

[54] BLADE SETTING TOOL FOR WOOD JOINTER/PLANER MACHINES

[76] Inventor: Donald R. Walston, Jr., 402 E. Vandalia Rd., Greensboro, N.C. 27406

[21] Appl. No.: 927,129

[22] Filed: Nov. 5, 1986

[51] Int. Cl.⁴ .............................................. B27G 23/00
[52] U.S. Cl. ........................................ 33/635; 33/201
[58] Field of Search ...................... 33/185 R, 201, 202

[56] References Cited

U.S. PATENT DOCUMENTS

| | | | |
|---|---|---|---|
| 2,496,800 | 2/1950 | Larkins | 33/185 R |
| 2,589,865 | 3/1952 | Rivard | 33/202 |
| 2,641,847 | 6/1953 | McCormick | 33/185 R |
| 2,700,993 | 2/1955 | Pence | 33/201 |
| 2,827,711 | 3/1958 | Elschlager | 33/185 R |
| 3,206,860 | 9/1965 | Warrick | 33/185 R |
| 3,894,340 | 7/1975 | Ellis, Jr. | 33/185 R |

FOREIGN PATENT DOCUMENTS

| | | | |
|---|---|---|---|
| 517969 | 5/1921 | France | 33/185 R |
| 146323 | 7/1931 | Switzerland | 33/185 R |

*Primary Examiner*—Richard R. Stearns
*Attorney, Agent, or Firm*—Charles R. Rhodes; Judith E. Garmon

[57] ABSTRACT

A blade setting tool for wood jointer/planer machines includes a jig member which is attached to the horizontal worktable of the machine and which supports a pair of vertically displaceable knife stops which are positioned in the path of rotation of the knife blades. The underside of a portion of the jig is utilized as a gauging surface for balancing the blades. The blade stops are pulled up and out of the path of blade rotation after a blade is balanced, thus permitting subsequent blades to rotate into place for balancing.

9 Claims, 3 Drawing Figures

BLADE SETTING TOOL FOR WOOD JOINTER/PLANER MACHINES

BACKGROUND AND SUMMARY OF THE PRESENT INVENTION

The present invention is directed to a tool for setting or leveling the blades in a wood jointer machine. Wood jointers generally include a horizontal worktable having a flat work-supporting and work-feeding surface, and a slot-type opening through the worktable for exposing a rotating cutter head. In use, the workpiece or wood is slidingly passed along the surface of the worktable and as the wood moves across the slot-opening, the blades engage and cut the undersurface of the wood.

The circular rotating cutter head used in jointer or planing machines generally includes a plurality of knife blades that are recessed into the cutting head, being held in place by a plurality of set screws. In order to obtain and maintain production of a precision finished product, the knife blades on the circular cutting head must be leveled on a regular basis. The blades must be leveled so that the cutting edge of the blades engage the surfaze of the workpiece evenly across the piece. Problems inherent in leveling or balancing the knife blades are complicated by the fact that the blades avry in diameter, knife-slot angles vary, knife thicknesses vary, and the base line cuts or cutting circles vary in diamter, and the set screws or other attachment means for holding the blades in the cutting head are of many different types. Consequently, there has previously been no device available which would function on a variety of jointer/planer machines to accurately position a wide variety of cutting blades.

Previous attempts at developing a blade setting device resulted in inventions such as those disclosed in U.S. Pat. Nos. 2,589,865; 2,700,993; and 2,827,711. Each of these patents discloses a device that is attached to the work surface and which includes a means for engaging the knife blades to set the blades at a particular level. Each of these devices must be removed from or otherwise repositioned on the machine in order to be able to rotate the cutter head to move subsequent blades into position for leveling. Each time a blade setting device is removed from the jointer machine, there is some chance that realignment will be compromised and subsequent knife blades will not be leveled in the same plane as previous blades. Understandably, the process of detaching and reattaching the setting tool requires a great deal of time that could be saved if there were a means for rotating the knife blades into position without detaching and realigning the setting tool.

It was to overcoming these problems in leveling the knife blades in a rotating cutter head that the present inventor turned. The resulting present invention is a unique tool which overcomes the above-identified problems and which provides a mechanism for quickly and accurately leveling successive knife blades in a rotating cutter head, without removing the setting tool when rotating the blades into position.

Generally, the present invention includes: (1) a pair of spaced, vertically movable blade stops for contacting and stopping the rotating knife blades when the cutting edge of the blade is at a prescribed height relative to the surface of the horizontal worktable; (2) a jig member having spaced apart gauging surfaces and including means for adjustably supporting the blade stops at the prescribed height; and (3) a means for displacing the blade stops out of the path of rotation of the knife blades after a selected blade has been leveled, and to permit subsequent blades to rotate into position for adjustment.

The jig member itself is a combination of cross bars which enable the jig to be adjustable according to the width of the horizontal worktable, and also to be adjustable with regard to accurately positioning the blade stops over the slot opening at a prescribed point to engage and stop the rotating knife blades. The jig is made of heavyweight metal such as stainless steel and is generally a very simple arrangement of parallel sidebars connected by a movable, elongated crossbar for adjusting the width of the jig. The undersurfaces of the sidebars serve as a gauging surface for the knife blades, with the undersurfaces extended over the slot in a plane corresponding to that of the work-supporting surface of the table. The blade stops are mounted in the forward ends of the parallel side bars and are vertically displaceable for permitting a blade to rotate past the stop.

Other objects, features, advantages, or modifications will become more apparent to those skilled in the art as the following detailed description is studied in conjunction with the accompanying drawings. In the drawings.

DETAILED DESCRIPTION OF A PREFERRED EMBODIMENT

Figure 1:
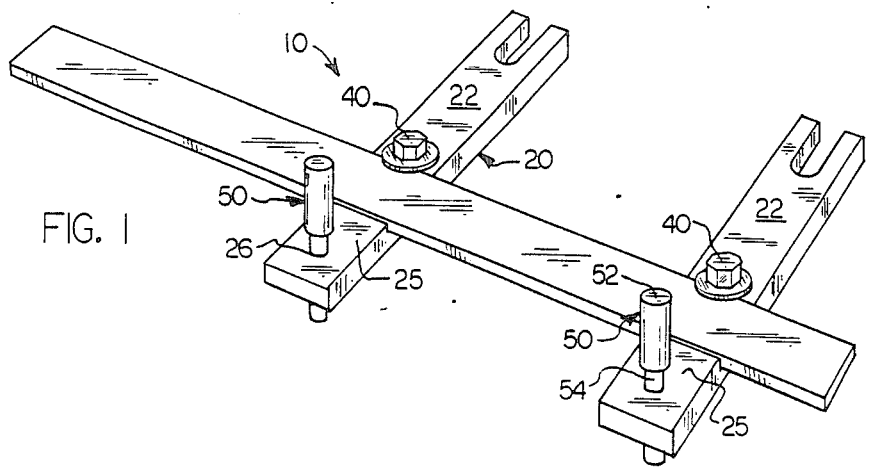
FIG. 1 is a perspective view of the blade setting tool according to a preferred embodiment.

Looking first at FIG. 1, the blade setting tool 10, according to a preferred embodiment is shown in perspective and includes a jig member 20 and a pair of blade indexing gauges 50.

The jig member 20 basically includes a pair of parallel sidebars 22 which are adjustably spaced apart on an interlocking crossbar 24 which connects the sidebars 22. The undersurface 23 serves as a gauging surface for the cutting blades, and the forward portion 25 of each crossbar 22 includes an aperture 26 therethrough for receiving the blade stops 50.

Figure 3:
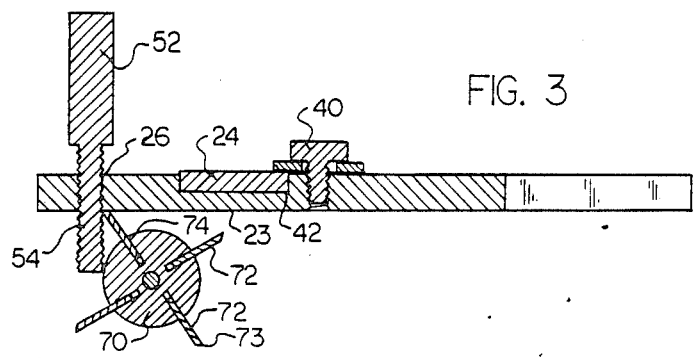
FIG. 3 is a cross-sectional view of the blade setting tool taken along lines 3—3 of FIG. 2.

The blade stops 50 are generally comprised of an upper, head portion 52 and a blade contacting end 54 which is received in the aperture 26. The end 54 may be smooth as shown in FIG. 1, or threaded as shown in FIG. 3, as will be explained below.

Figure 2:
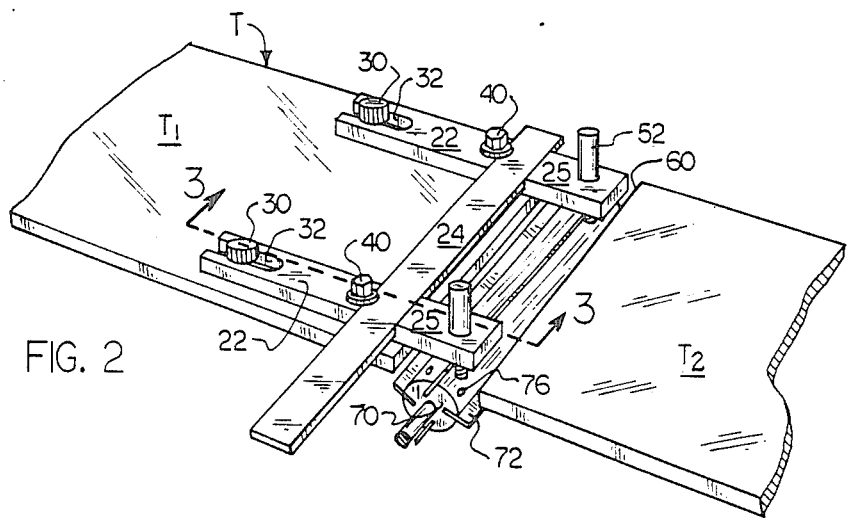
FIG. 2 is a perspective view of the blade setting tool as it is mounted on the horizontal worktable of a wood jointer machine.

Looking next at FIG. 2, the jig member 20 is attached to the upper surface of the horizontal worktable T of the wood jointer machine. The table T generally includes the horizontal work surfaces or wood-supporting surfaces $T_1$ and $T_2$ which are separated by a slot-type opening 60 across the width of the table. The slot-type opening 60 exposes the rotating cutter element 70 on which are mounted a plurality of knife blades 72. The knife blades 72 are retained in slots 74 in the rotating head by means of set screws 76 on each end of the knife blade. It is these set screws 76 which must be loosened in order to adjust the position of the knife blade 72 in the slot 74. The adjustment of the knife blade and its positioning in relationship to the blade stops 50 is described in detail below, and is most clearly shown in FIG. 3.

In use, the jig member 20 is attached to the upper surface of the worktable T by means of threaded nuts 30. The nuts 30 are threaded into selected ones of a plurality of threaded apertures (not shown) on the top surface of the worktable T₁. To adjust the correct positioning of the jig 20 in relationship to the slot 60, an elongated notch 32 is provided in the rearward end of each of the parallel sidebars 22. As shown in FIG. 2, the notches 32 are open at one end for moving the support bars into place under nuts 30. To move the jig member 20 backward or forward on worktable T₁, the nuts 30 are loosened and the position of the jig member 20 adjusted along the longitudinal axis of the worktable by means of moving the jig backward or forwardly around nuts 30.

To adjust the width of jig member 20 in order to accomodate worktables of various widths, threaded nuts 40, which overlie but do not extend through the crossbar, are loosened to allow adjustment of the positions of sidebars 22 along the length of crossbar 24. Crossbar 24 is a separate, freely movable metal bar, which is movably positioned in guideways 42 of each crossbar, and held by friction by the undersurface of nuts 40 and underlying washers 41. To widen the space between parallel bars 22, the threaded nuts 40 are loosened, permitting the crossbar to move, and bars 22 pushed away from each other to a selected width which can be at least as wide as the length of crossbar 24. When the crossbars 22 are the correct distance apart, threaded nuts 40 and the underlying washers 41 are tightened against crossbar 24. The jig is then mounted on Table T₁ by positioning the jig so that the blade stops 50 are suspended above the slot 60 in a position to contact and stop the rotating knife blades 72 at approximately the angle shown in FIG. 3. Each individual knife blade 72 is rotated into position to contact the blade stops 50 at the point of intersection of the stops 50 and the gauging surfaces 23 of crossbar 22. At that intersecting point the blade is positioned such that in normal rotation, the leading or cutting edge 73 of the blade is slightly above the plane of the surface of worktable T. So positioned, the cutting edge 73 will cut into the workpiece to cut away the undersurface thereof.

When the selected blade is rotated into position, the blade is initially loosened by releasing the set screws 76, after which the blade is adjusted upwardly on each end until it is properly positioned against the gauging surface 23, and the leading or cutting edge 73 is positioned in the intersecting angle between stop 50 and gauging surface 23. At that point the blade is level across the width thereof and the set screws are tightened to hold the blade in position.

To rotate subsequent blades into position for alignment, the blade stops 50 are moved upwardly out of engagement with the blades, allowing the balanced blade to rotate past. The lower end 54 of the blade stops may be threaded or may be a smooth surface as shown in FIG. 1. If the stops 50 have a smooth surface, they may be simply lifted out of place to allow the balanced blade to pass and subsequent blades to rotate into position. When the balanced blade is past, the stops 50 are dropped back into the aperture to provide a stop means for subsequent knife blades.

As seen in FIG. 3, the lower end 54 of the stop is threaded. Threading the end 54 allows for a means of retaining the blade stop in the correspondingly threaded aperture so that the stops do not accidentally fall out or slip out of position when balancing the knife blade. In use, this embodiment is threaded into the correct position as shown in FIG. 3 where the stops 50 remain until the knife blade 72 is leveled. When the leveling is completed, the blade stops 50 are rotated upwardly to permit the blade 72 to pass in rotation. Although the threaded lower end 54 somewhat lessens the likelihood that the blade stops will be lost out of the jig member 20 when the knife setting tool is not in use, the smooth surface 54 shown in FIG. 1 provides a quicker means for moving the blade stops out of engagement with the rotating knife blades.

When all of the knife blades have been leveled, the jig member 20 and the attached blade stops 50 are removed from the jointer table. It is thus shown that the improved blade setting tool is a substantial improvement over known devices in that the jig is easily adjustable in both length and width dimensions, and the blade stops are quickly moved out of place when it is necessary to rotate a blade into position. While a preferred embodiment has been shown and described, the above detailed description is in no way meant to limit the scope of the invention. Additionally, other and further modifications of the present invention may become apparent to those skilled in the art, while remaining within the scope of the claims below.

What is claimed is:

1. A blade setting tool for wood jointer/planer machines of the type having a horizontal worksupporting-/feeding table, a slot-type opening across the width of the table and through which rotatable knife blades are exposed for cutting the workpiece as the workpiece passes over the table; said blade setting tool comprising:
    (a) a jig member having:
        (i) means for adjusting the width of said jig to accomodate worktables of various width;
        (ii) means for adjusting said jig along the longitudinal axis of said worktable and for securing said jig in a position wherein a portion of said jig overlies said slot opening in said table;
        (iii) the said portion of said jig overlying said slot-type opening having an undersurface constituting a gauging surface for balancing said knife blades;
    (b) a pair of spaced apart, vertically displaceable blade stops for stopping and retaining said knife blades at a prescribed point in the path of rotation; said blade stops being supported by said jig and being vertically displaceable from a first position in contact with said knife blades to a second position outside the path of rotation of said knife blades;
whereby a selected one of said knife blades is balanced against said gauging surface and said blade stops, and after balancing, said blade stops are displaced to said second position to allow the balanced blade to rotate past said blade stops, thereby moving subsequent blades into position for balancing while said jig member remains as originally positioned on said worktable.

2. A blade setting tool according to claim 1 wherein said jig comprises:
    (a) a pair of spaced sidebars which extend substantially parallel to the longitudinal axis of said worktable when said jig is attached thereto; said sidebars having a forward portion overlying said slot opening, and a rearward portion;
    (b) an elongated crossbar movably connected at right angles to said sidebars;
    (c) means associated with said forward portions of said sidebars for supporting said blade stops at said prescribed point in the path of rotation of said knife blades; and (d) said means for adjusting the width of said jig being comprised of means for adjusting the distance between said sidebars.

3. A blade setting tool according to claim 2 wherein the means for adjusting said jig along the longitudinal axis of said worktable comprises: an elongated slot cut along the longitudinal axis of said rearward portion of each of said sidebars; a means extending through each of said slots for removably attaching said jig to the surface of said worktable; said sidebars being adjustable toward or away from said slot opening in said worktable a distance equivalent to the length of said elongated slots in said sidebars.

4. A blade setting tool according to claim 2 wherein said means for adjusting the distance between said sidebars includes a guideway cut out of each of said sidebars intermediately of said forward and rearward portions; said crossbar being movably positioned in said guideways, for connecting said sidebars to said crossbar; and means for retaining said sidebars in a selected position on said crossbar.

5. A blade setting tool according to claim 2 wherein a part of each of said forward portions of said side bars overlies said slot opening in said worktable, the undersurfaces of said forward portions thereby constituting said gauging surface against which said knife blades are balanced.

6. A blade setting tool according to claim 2 wherein said means for supporting said blade stops includes:

(a) an aperture extending through each of said forward portions of said sidebars;
(b) each of said blade stops being of a size and configuration to be movably supported in said aperture and displaceable from said first to said second position; a portion of each of said blade stops depending beneath said forward portion of said sidebar, to prevent further rotation of said knife blade, when said blade stop is in said first position.

7. A blade setting tool according to claim 6 wherein each of said blade stops includes;
(a) a cylindrical body member having first and second parts joined in end-to-end relationship;
(b) said first part having an outer diameter substantially equivalent to the inner diameter of said aperture;
(c) said second part having an outer diameter greater than the outer diameter of said aperture, whereby said blade stop is retained in said aperture with said second part being suspended above the upper surface of said side bar and said first part depending beneath said sidebar in said blade stopping, first position.

8. A blade setting tool according to claim 7 wherein said first part of each of said blade stops has a smooth outer surface.

9. A blade setting tool according to claim 7 wherein said first part of each of said blade stops has a threaded outer surface, and said aperture has a correspondingly threaded inner surface.

* * * * *